United States Patent
Fourrey et al.

[11] Patent Number: 5,971,491
[45] Date of Patent: Oct. 26, 1999

[54] MOTOR VEHICLE SEAT WITH ON-BOARD SAFETY BELT AND ARRANGEMENT OF THE SEAT IN THE PASSENGER COMPARTMENT OF THE VEHICLE

[75] Inventors: François Fourrey; Pierre Laporte, both of Nogent sur Vernisson, France

[73] Assignee: Ecia - Equipements et Composants Pour l'Industrie Automobile, Audincourt, France

[21] Appl. No.: 08/985,360

[22] Filed: Dec. 4, 1997

[30] Foreign Application Priority Data

Dec. 24, 1996 [FR] France .................................. 96 15993

[51] Int. Cl.$^6$ .................................................. B60R 21/00
[52] U.S. Cl. ........................... 297/476; 280/806; 297/484
[58] Field of Search .................................. 297/483, 484, 297/468, 480, 476; 242/374; 280/806

[56] References Cited

U.S. PATENT DOCUMENTS

| | | | |
|---|---|---|---|
| 4,006,934 | 2/1977 | Murakami et al. ...................... | 297/480 |
| 4,232,836 | 11/1980 | Fohl ........................................ | 242/374 |
| 4,289,352 | 9/1981 | Ashworth ............................. | 297/468 X |
| 4,973,083 | 11/1990 | Richards et al. . | |
| 5,022,677 | 6/1991 | Barbiero .............................. | 297/483 X |
| 5,123,673 | 6/1992 | Tame .................................... | 297/484 X |
| 5,423,598 | 6/1995 | Lane, Jr. et al. ..................... | 280/806 X |
| 5,441,332 | 8/1995 | Verellen .................................. | 297/483 |
| 5,658,051 | 8/1997 | Vega et al. ............................. | 297/483 |
| 5,733,013 | 3/1998 | Brown .................................... | 297/483 |

FOREIGN PATENT DOCUMENTS 30 39 598   5/1982   Germany .

*Primary Examiner*—Peter M. Cuomo
*Assistant Examiner*—Stephen Vu
*Attorney, Agent, or Firm*—Wenderoth, Lind & Ponack, L.L.P.

[57] ABSTRACT

A vehicle seat comprises a safety belt (24) having three anchoring points borne by the seat (10). The belt (24) has two straps—a diagonal strap (26) and a lap strap (28)—which are connected to the anchoring points. The diagonal strap (26) has an upper end (E1) and a lower end (E2) which is common to the lap strap (28). This upper end (E1) and this lower end (E2) are placed on opposite sides—left and right—of the seat, so that the diagonal strap (26) extends obliquely from top to bottom of the seat. The upper end (E1) and lower end (E2) of the diagonal strap (26) can be switched over between the left-hand side and the right-hand side of the seat. The seat (10) preferably comprises two upper belt turn fixtures—a left-hand one (40) and a right-hand one (42)—and the belt (24) has two catches (36,38) which are intended to be fastened into two buckles—a left-hand one (32) and a right-hand one (34)—borne by the seat.

27 Claims, 5 Drawing Sheets

MOTOR VEHICLE SEAT WITH ON-BOARD SAFETY BELT AND ARRANGEMENT OF THE SEAT IN THE PASSENGER COMPARTMENT OF THE VEHICLE

BACKGROUND OF THE INVENTION

The present invention relates to a motor vehicle seat with an on-board safety belt and to an arrangement of this seat in the passenger compartment of the vehicle.

There is already known in the state of the art a motor vehicle seat of the type comprising an on-board safety belt with three anchoring points borne by the seat. This type of seat includes a belt having two straps—a diagonal strap and a lap strap—connected to the anchoring points. The diagonal strap has an upper end and a lower end which is common to the lap strap. The upper end and the lower end of the diagonal strap are positioned, when the belt is being used by an occupant of the seat, on opposite sides—left and right—of the seat, so that the diagonal strap extends obliquely from top to bottom of the seat.

FR-A-2, 699,973 (FR-A-92 15 857) describes a seat of this type which can be fastened removably to the floor of the passenger compartment of a motor vehicle of the single-volume kind.

For various reasons associated particularly with behaviour of the safety belt in the event of an impact, the end which is common to both the diagonal and lap straps is placed on the innermost side of the seat. Thus, for a left-hand seat, the end which is common to the diagonal and lap straps is placed on the right-hand side of the seat, and for a right-hand seat, this common end is placed on the left-hand side of the seat.

This chiral symmetry between the anchoring points of two seats—a left-hand seat and a right-hand seat—does not allow these two seats to be swapped over in the passenger compartment.

The constructors of seats with on-board safety belts therefore have to have separate production lines, one for the left-hand seat and one for the right-hand seat. This increases the overall costs of the vehicle.

BRIEF SUMMARY OF THE INVENTION

The purpose of the invention is, in particular, to provide a removable seat with an on-board belt, which can reversibly form either a left-hand seat or a right-hand seat.

Accordingly, the subject of the invention is a motor vehicle seat of the aforementioned type, characterized in that the upper end and lower end of the diagonal strap can be switched between the left-hand side and the right-hand side of the seat.

A first end of the belt is fastened to a winder forming a first anchoring point, arranged more or less at the middle between the left-hand and the right-hand sides of the seat. An end catch is fastened to the second end of the belt. An intermediate catch is connected to the common end of the diagonal strap and lap strap, so that it can slide along the belt. The two catches are intended to be fastened, in a way that can be switched over between the left-hand and the right-hand sides of the seat, into two fastening buckles—one on the left and one on the right—which form the second and third anchoring points. The upper end of the diagonal strap is connected to the first anchoring point. The strap passes, in a way that can be switched over between the left-hand and the right-hand side of the seat, through one of two upper turn fixtures—a left-hand one and a right-hand one—borne by the seat.

The belt has a connecting strap which extends, from upstream to downstream, between the winder and one of the upper turn fixtures through a guide borne by the seat. This guide comprises a support and two guide rollers—an upstream one and a downstream one—which are mounted so they can rotate in the support about axles that are more or less horizontal and transverse to this seat, so as to make the connecting strap traverse the guide by following a chicane-shaped path. The guide is placed more or less in the middle between the left-hand side and the right-hand side of the seat.

The downstream roller has a left-hand end and a right-hand end which are formed, respectively, by two flared cheeks that converge towards one another. These cheeks make it easier to incline to the left or the right the portion of connecting strap that extends from the guide towards either the left-hand upper turn fixture or the right-hand one.

The seat has a pyrotechnic belt pretensioner that is set off in the event of an impact, which has a first end connected to the two fastening buckles and a second end connected to the downstream roller. This downstream roller is mounted so that it can be moved more or less perpendicularly to the axis about which it rotates in the guide support. The action of setting off the pretensioner causes its ends to contract, or retract towards one another.

The turn fixtures each have the overall shape of an elongated and flattened runner, with a more or less rectangular cross section delimited by two opposed long sides between which the belt is guided. One of the long sides has a slot extending along the turn fixture, more or less along a broken or crooked line, allowing the belt to be inserted through the turn fixture, and allowing the belt to be extracted from this turn fixture.

Another subject of the invention is an arrangement of a seat as defined hereinabove in the passenger compartment of a motor vehicle, characterized in that the seat is removably fastened to a part of the vehicle body which forms the floorpan of the passenger compartment.

BRIEF DESCRIPTION OF THE DRAWINGS

The invention will be better understood from reading the description which will follow which is given merely by way of example and made with reference to the drawings in which.

DETAILED DESCRIPTION OF THE DRAWINGS

Figure 1:
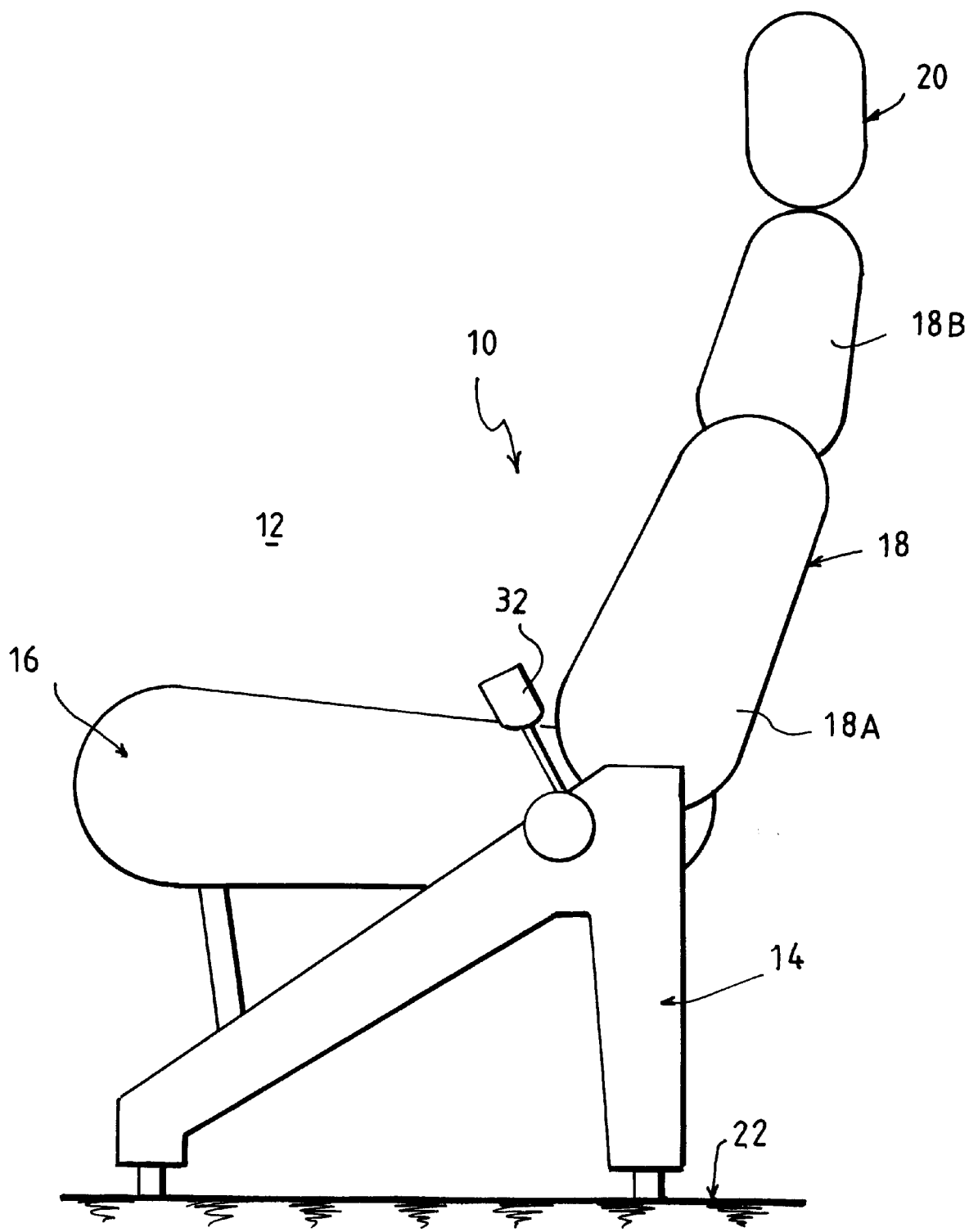
FIG. 1 is a diagrammatic side elevation of a seat according to the invention arranged in the passenger compartment of a motor vehicle.

Depicted in FIGS. 1 to 4 is a seat 10 according to the invention arranged in the passenger compartment 12 of a motor vehicle which is, for example, of the single-volume type.

Conventionally, the seat 10 comprises an underframe 14, a seat cushion 16 and a backrest 18, surmounted by a head restraint 20.

The backrest 18 may comprise two parts—a lower part 18A and an upper part 18B—articulated one above the other. The underframe 14 may be fastened removably to part of the body of the vehicle that forms a floorpan 22 of the passenger compartment.

Figure 2:
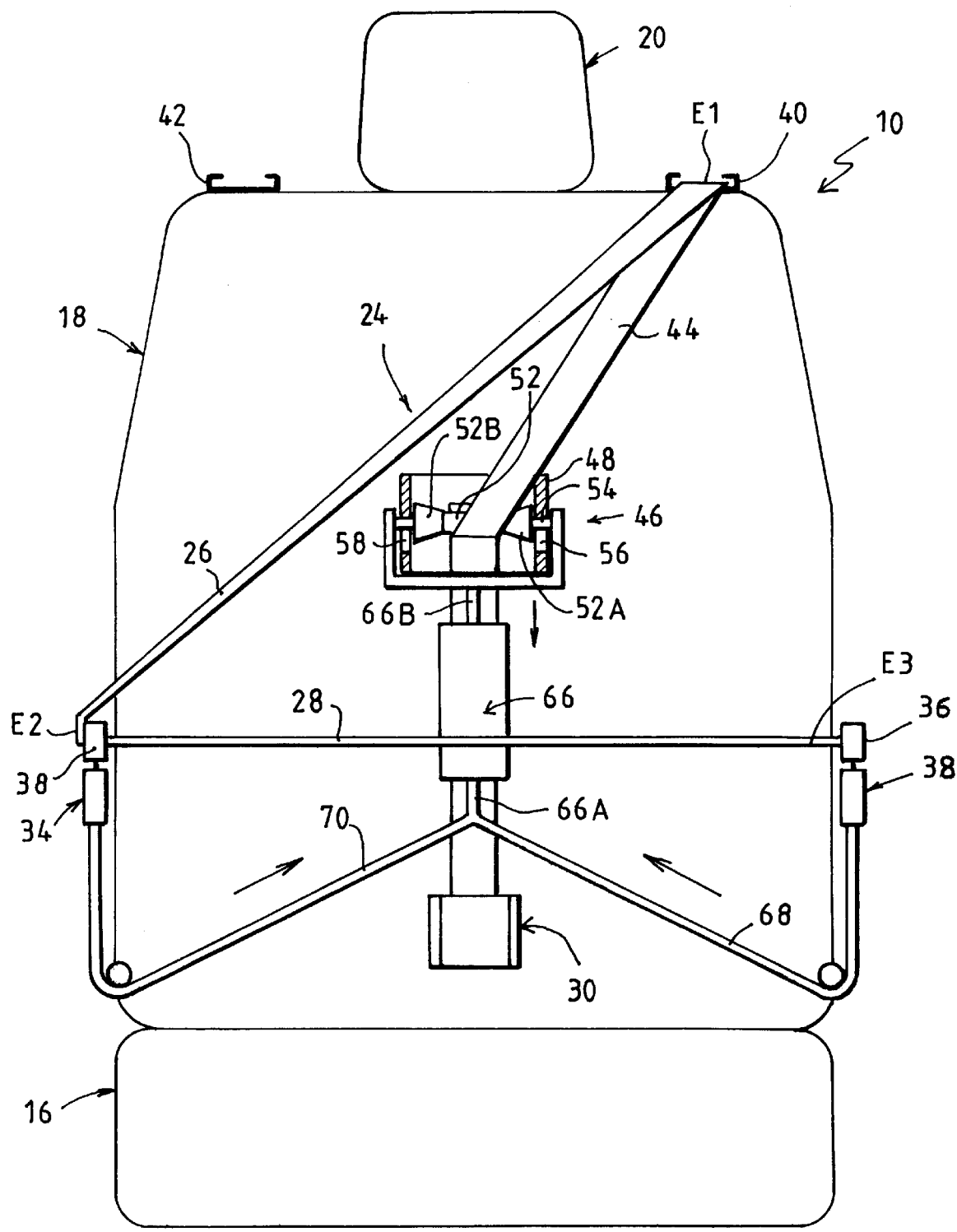
FIG. 2 is a front elevation of the seat depicted in FIG. 1, forming a left-hand seat.
Figure 3:
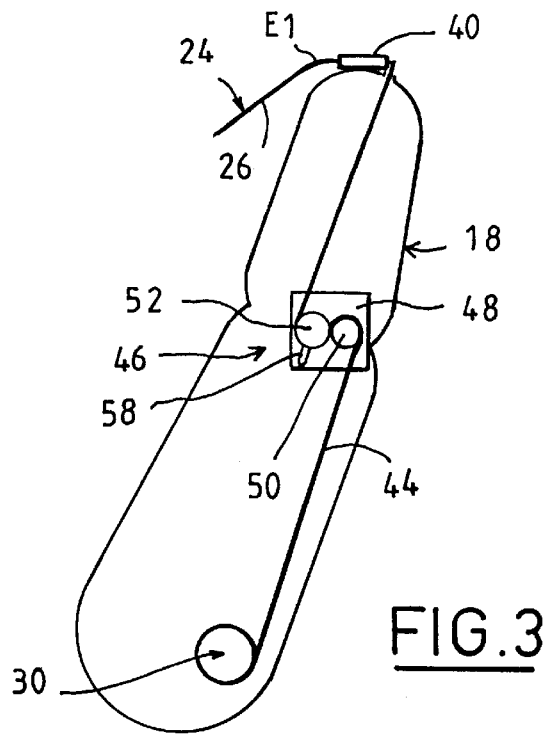
FIG. 3 is a partial view similar to FIG. 1 depicting the backrest of the seat.
Figure 4:
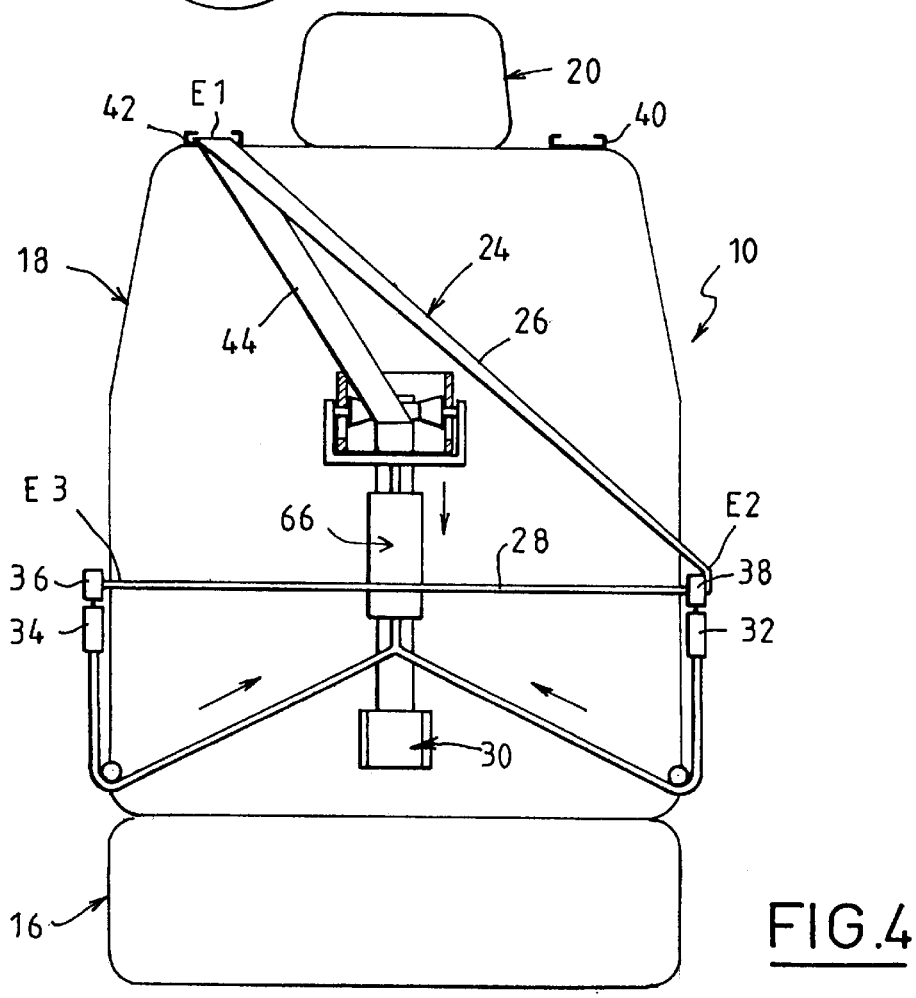
FIG. 4 is a view similar to FIG. 2, in which the seat forms a right-hand seat.

The seat 10 also has an on-board safety belt 24 depicted in FIGS. 2 to 4. In these figures, the belt 24 is depicted in the position in which it is used by an occupant (not depicted) sitting in the seat. The belt 24 has three anchoring points borne by the seat, and has two straps—a diagonal strap 26 and a lap strap 28—which are connected to these anchoring points. The diagonal strap 26 has an upper end E1 and a lower end E2 which is common with the lap strap 28.

In what follows, the orientations front, back, left and right correspond to the usual orientations of an occupant sitting in the seat.

When the belt 24 is in use, the ends E1,E2 of the diagonal strap 26 are placed on opposite sides—left and right—of the seat, so that the diagonal strap 24 extends obliquely from top to bottom of the seat.

The ends E1,E2 of the diagonal strap 26 can be switched over between the left-hand side and the right-hand side of the seat 10, so that this seat can either form a left-hand seat, as is depicted in FIG. 2, or a right-hand seat, as is depicted in FIG. 4. It will be noted that in the case of a left-hand seat, the end E2 common to the diagonal strap 26 and to the lap strap 28 is on the right-hand side of the seat, and that in the case of a right-hand seat, this end E2 is on the left-hand side of the seat.

A first end of the belt 24 is fastened to a winder 30, of conventional type with automatic recoil. This winder 30, which forms a first anchoring point to the belt, is placed more or less in the middle between the left-hand side and the right-hand side of the seat. It will be noted that for reasons of clarity, in FIGS. 2 to 4 the winder 30 has been depicted placed at the bottom of the backrest 18. However, the winder 30 is preferably fixed to a rear part of the underframe 14.

Figure 7:
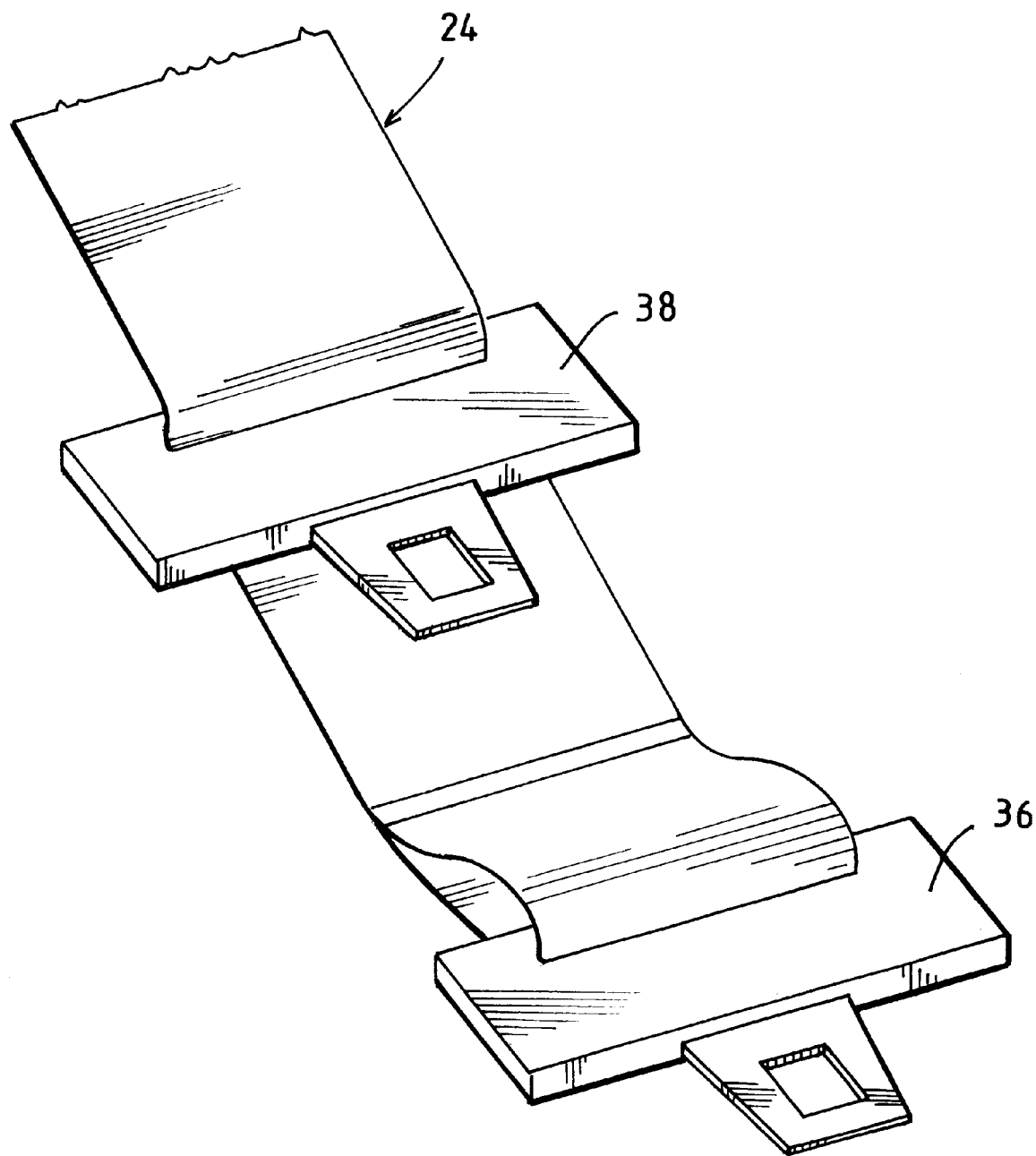
FIG. 7 is a detail view of the two catches of the safety belt of the seat depicted in FIGS. 1 to 4.

The second and third anchoring points of the belt are formed by two female fastening members—a left-hand one 32 and a right-hand one 34—known as buckles. These buckles 32,34 are intended to interact with male fastening members borne by the belt 24, one of them called an end catch 36, and the other called an intermediate catch 38. The end catch 36 is fastened to the second end of the belt 24 which corresponds to the end E3 of the lap strap 28 which is not the common end E2. The intermediate catch 38 is connected to the common end E2, so that it can slide along the belt 24. The catches 36, 38 depicted in greater detail in FIG. 7 are intended to be fastened in a way that can be switched over between the left-hand and the right-hand side of the seat 10, into the two buckles 32,34.

Two upper belt turn fixtures—a left-hand one 40 and a right-hand one 42—are borne by the top of the backrest 18. Referring in particular to FIG. 3, it can be seen that the belt 24 has a connecting strap 44 extending, from upstream to downstream, between the winder 30 and one of the turn fixtures 40, 42. The upper end E1 of the diagonal strap 26 is connected to the winder 30 via the connecting strap 44 which passes, in a way that can be switched between the left-hand side and the right-hand side of the seat 10, through one of the turn fixtures 40,42. The connecting strap 44 traverses a guide 46 borne by the backrest 18 and placed more or less in the middle between the left-hand and the right-hand sides of the seat. The guide 46 has a support 48 and two guide rollers—an upstream roller 50 and a downstream roller 52—which are mounted so that they can rotate in the support 48 about axes that are more or less horizontal and transverse to the seat. This makes the connecting strap 44 traverse the guide 46 by following a chicane-shaped, or zigzag path. The support 48 is fixed, for example to the framework of the backrest 18, preferably near to an articulation between the two parts 18A,18B of the backrest.

Referring in particular to FIGS. 2 and 4, it can be seen that the axis about which the downstream roller 52 rotates is embodied by a pin 54. This pin is mounted so that it can be moved in a direction which is more or less perpendicular to the axis of rotation in more or less vertical slots 56,58, which form bearings in the support 48.

The downstream roller 52 preferably has the overall shape of a diabolo or a hyperboloid of revolution. Thus, the left-hand end and the right-hand end of this roller 52 are delimited respectively by two flared cheeks 52A,52B that converge towards one another. These flared cheeks make it easier to incline to the left or to the right the portion of connecting strap 44 that extends from the guide 46 towards either the left-hand turn fixture 40 or the right-hand one 42.

Figure 6:
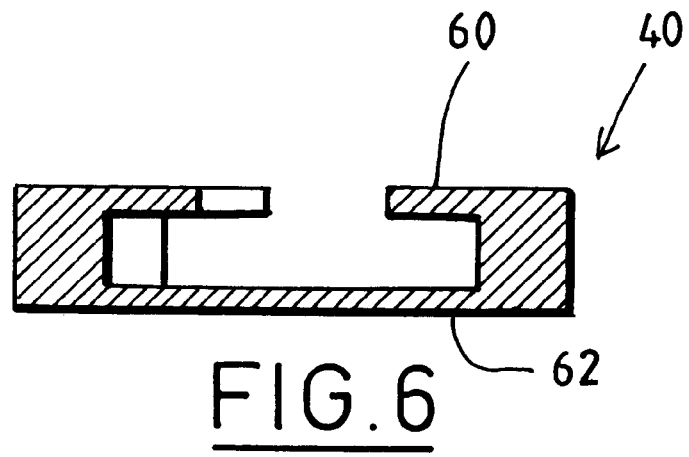
FIG. 6 is a section of 6—6 of the FIG. 5.
Figure 5:
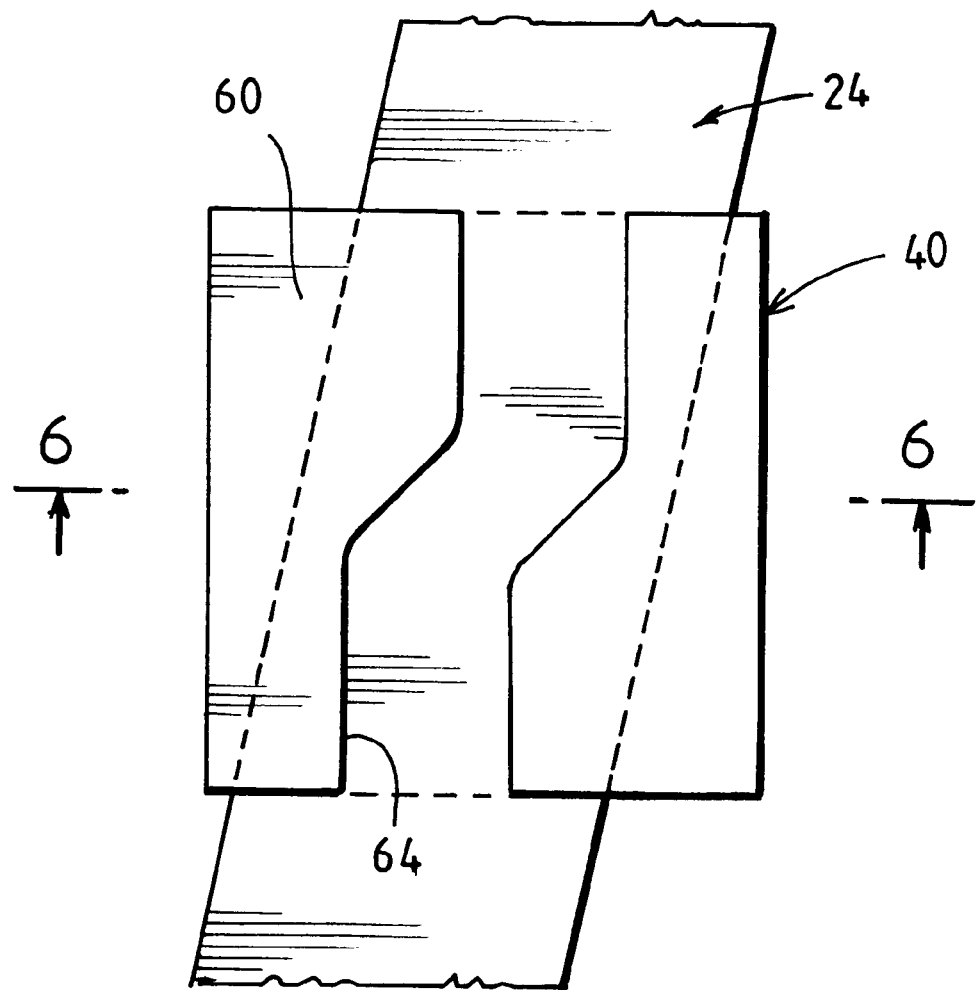
FIG. 5 is a detail plan view of one of the upper turn fixtures of the seat depicted in the previous figures.

Referring to FIGS. 5 and 6, in which the left-hand turn fixture 40 has been depicted in greater detail, it can be seen that this fixture has the overall shape of an elongated and flattened runner of more or less rectangular cross section. This shape is delimited by two opposed wide sides—an upper side 60 and a lower side 62—between which the belt 24 is guided, and two opposed outer sides. The upper long side 60 has a slot 64 extending along the turn fixture 40, more or less along a broken, or crooked, line. This slot 62 allows a user to insert the belt 24 through the turn fixture 40 and to extract this belt from the turn fixture 40 in such a way that there is no risk of the belt 24 escaping unintentionally from the turn fixture into which it has been introduced.

The left-hand turn fixture 40 and right-hand turn fixture 42 can be readily understood one from the other by chiral symmetry. Each of the turn fixtures 40, 42 guides the diagonal strap 26 towards the opposite side of the seat from it.

The seat 10 also has a pyrotechnic belt pretensioner 66 set off, in the event of the vehicle experiencing an impact, by conventional means. This pretensioner 66 has a first end 66A connected by conventional means with cables 68,70 to the two buckles 32,34, and a second end 66B connected, by a clevis-type mount, to the pin 54 that carries the downstream roller 52. Setting off the pretensioner 66 causes its ends 66A,66B to contract, or retract one towards the other so as to urge the buckles 32,34 and the guide 46 in directions that tend to tension the diagonal strap 26 and lap strap 28 of the belt, in the directions of the arrows depicted in FIGS. 2 and 4.

The seat 10 is very simple to use. When the seat 10 forms a left-hand seat, for example a driver's seat, the belt 24 passes through the left-hand runner 40 and the end catch 36 is fastened into the left-hand buckle 32. The occupant of the seat can use the belt 24 in the same way as the conventional belt by fastening the intermediate catch 38 into the right-hand buckle 34, once in the seat, as is depicted in FIG. 2. To get out of the seat, the occupant unfastens the belt 24 by detaching the intermediate catch 38 from the right-hand buckle 34, the end catch 36 remaining permanently fastened in the left-hand buckle 32.

To convert the left-hand seat depicted in FIG. 2 into a right-hand seat as depicted in FIG. 4, the user shifts the removable seat from the left-hand side to the right-hand side of the passenger compartment. The user then extracts the belt 24 from the left-hand turn fixture 40 to place it in the right-hand turn fixture 42, and finally fastens the end catch 36 in the right-hand buckle 34. The belt 24 can then be used as a conventional belt by fastening the intermediate catch 38 in the left-hand buckle 32 or by unfastening this catch 38 from this buckle 32, with the end catch 36 remaining permanently fastened in the right-hand buckle 34.

It will be noted that the change between the left-handed and right-handed configurations of the seat is very simple to carry out. The two catches 36,38 and the guide 46 in particular make it possible to avoid twisting the belt when changing from one configuration to the other. Furthermore, in the event of the vehicle experiencing an impact, the pretensioner 66 allows all three ends E1 to E3 of the diagonal strap and of the lap strap which are connected to the three anchoring points to be tensioned simultaneously.

Of course the invention is not limited to the embodiment described hereinabove. In particular, the seat is not necessarily removable and may be fixed permanently into the passenger compartment. Therefore, the invention allows the passenger compartment to be fitted with identical left-hand and right-hand seats.

Having described the invention, we claim:

1. A vehicle safety apparatus comprising:
   a seat including a seat cushion and a backrest, wherein said backrest has an upper end and a lower end;
   a safety belt having a diagonal strap and a lap strap;
   said safety belt being attached to said seat at a first end point, an intermediate point, and a second end point, said intermediate point being common to said diagonal strap and said lap strap;
   a right-side buckle attached to a right side of said seat;
   a left-side buckle attached to a left side of said seat;
   an intermediate catch positioned on said intermediate point of said safety belt;
   an end catch positioned on said second end point of said safety belt;
   a right-side turn fixture positioned on a right side of said upper end of said backrest;
   a left-side turn fixture positioned on a left side of said upper end of said backrest; and
   said safety strap being capable of being arranged in a first position, wherein said diagonal strap extends from said right-side turn fixture to said intermediate catch, said intermediate catch being removably fastened to said left-side buckle and said end catch being removably fastened to said right-side buckle, or a second position, wherein said diagonal strap extends from said left-side turn fixture to said intermediate catch, said intermediate catch being removably fastened to said right-side buckle and said end catch being removably fastened to said left-side buckle.

2. The apparatus of claim 1, wherein said first end point of said safety belt is attached to a winder positioned on said seat such that said safety belt extends from said winder to said intermediate point through either said right-side turn fixture or said left-side turn fixture.

3. The apparatus of claim 2, further comprising a guide positioned on said seat such that said safety belt traverses said guide as said safety belt extends from upstream to downstream between said winder and said either of said right-side turn fixture or said left-side turn fixture.

4. The apparatus of claim 3, wherein said guide has at least one roller, including a downstream roller which is said at least one roller that is positioned farthest downstream from said winder.

5. The apparatus of claim 4, wherein said downstream roller has two ends, each of said ends having a flared cheek portion.

6. The apparatus of claim 1, further comprising a belt pretensioner positioned on said seat.

7. The apparatus of claim 6, wherein said belt pretensioner has two opposed ends linked to said safety belt, said opposed ends being capable of contracting when said safety belt pretensioner is activated.

8. The apparatus of claim 1, wherein each of said turn fixtures has an upper side and a lower side separated by two opposed outer sides, said upper side having a slot that extends a length of said upper side along said opposed outer sides.

9. The apparatus of claim 1, wherein said intermediate catch is attached to said safety belt so that said intermediate catch is capable of sliding movement along said safety belt.

10. A vehicle safety apparatus comprising:
    a seat including a seat cushion and a backrest, wherein said backrest has an upper end and a lower end;
    a safety belt having a diagonal strap and a lap strap;
    said safety belt being attached to said seat at a first end point, an intermediate point, and a second end point, said intermediate point being common to said diagonal strap and said lap strap;
    an intermediate catch positioned on said intermediate point of said safety belt, said intermediate catch removably fastened to a side of said seat;
    an end catch positioned on said second end point of said safety belt, said end catch being removably fastened to a side of said seat opposite said intermediate catch;
    a right-side turn fixture positioned on a right side of said upper end of said backrest;
    a left-side turn fixture positioned on a left side of said upper end of said backrest; and
    said safety strap being capable of being arranged in a first position, wherein said diagonal strap extends from said right-side turn fixture to said intermediate catch, said intermediate catch being removably fastened to a left side of said seat, or a second position, wherein said diagonal strap extends from said left-side turn fixture to said intermediate catch, said intermediate catch being removably fastened to a right side of said seat.

11. The apparatus of claim 10, wherein said first end point of said safety belt is attached to a winder positioned on said seat such that said safety belt extends from said winder to said intermediate point through either said right-side turn fixture or said left-side turn fixture.

12. The apparatus of claim 11, further comprising a guide positioned on said seat such that said safety belt traverses said guide as said safety belt extends from upstream to downstream between said winder and said either of said right-side turn fixture or said left-side turn fixture.

13. The apparatus of claim 12, wherein said guide has at least one roller, including a downstream roller which is said at least one roller that is positioned farthest downstream from said winder.

14. The apparatus of claim 13, wherein said downstream roller has two ends, each of said ends having a flared cheek portion.

15. The apparatus of claim 10, further comprising a belt pretensioner positioned on said seat.

16. The apparatus of claim 15, wherein said belt pretensioner has two opposed ends linked to said safety belt, said opposed ends being capable of contracting when said safety belt pretensioner is activated.

17. The apparatus of claim 10, wherein each of said turn fixtures has an upper side and a lower side separated by two opposed outer sides, said upper side having a slot that extends a length of said upper side along said opposed outer sides.

18. The apparatus of claim 10, wherein said intermediate catch is attached to said safety belt so that said intermediate catch is capable of sliding movement along said safety belt.

19. A vehicle safety apparatus comprising:
- a vehicle body including a floorpan;
- a seat including a seat cushion and backrest, wherein said backrest has an upper end and a lower end;
- said seat being removably fastened to said floorpan of said vehicle body;
- a safety belt having a diagonal strap and a lap strap;
- said safety belt being attached to said seat at a first end point, an intermediate point, and a second end point, said intermediate point being common to said diagonal strap and said lap strap;
- an intermediate catch positioned on said intermediate point of said safety belt, said intermediate catch removably fastened to a side of said seat;
- an end catch positioned on said second end point of said safety belt, said end catch being removably fastened to a side of said seat opposite said intermediate catch;
- a right-side turn fixture positioned on a right side of said upper end of said backrest;
- a left-side turn fixture positioned on a left side of said upper end of said backrest; and
- said safety strap being capable of being arranged in a first position, wherein said diagonal strap extends from said right-side turn fixture to said intermediate catch, said intermediate catch being removably fastened to a left side of said seat, or a second position, wherein said diagonal strap extends from said left-side turn fixture to said intermediate catch, said intermediate catch being removably fastened to a right side of said seat.

20. The apparatus of claim 19, wherein said first end point of said safety belt is attached to a winder positioned on said seat such that said safety belt extends from said winder to said intermediate point through either said right-side turn fixture or said left-side turn fixture.

21. The apparatus of claim 20, further comprising a guide positioned on said seat such that said safety belt traverses said guide as said safety belt extends from upstream to downstream between said winder and said either of said right-side turn fixture or said left-side turn fixture.

22. The apparatus of claim 21, wherein said guide has at least one roller, including a downstream roller which is said at least one roller that is positioned farthest downstream from said winder.

23. The apparatus of claim 22, wherein said downstream roller has two ends, each of said ends having a flared cheek portion.

24. The apparatus of claim 19, further comprising a belt pretensioner positioned on said seat.

25. The apparatus of claim 24, wherein said belt pretensioner has two opposed ends linked to said safety belt, said opposed ends being capable of contracting when said safety belt pretensioner is activated.

26. The apparatus of claim 19, wherein each of said turn fixtures has an upper side and a lower side separated by two opposed outer sides, said upper side having a slot that extends a length of said upper side along said opposed outer sides.

27. The apparatus of claim 19, wherein said intermediate catch is attached to said safety belt so that said intermediate catch is capable of sliding movement along said safety belt.

* * * * *